United States Patent [19]
Denove et al.

[11] Patent Number: 5,486,914
[45] Date of Patent: Jan. 23, 1996

[54] LCD BARGRAPH MOTION PICTURE LIGHT METER

[75] Inventors: Thomas F. Denove, Agoura Hills; William L. Blowers, Newhall, both of Calif.

[73] Assignee: GDB Enterprises, Inc., Burbank, Calif.

[21] Appl. No.: 266,102

[22] Filed: Jun. 27, 1994

Related U.S. Application Data

[63] Continuation of Ser. No. 883,416, May 14, 1992, abandoned.

[51] Int. Cl.$^6$ ........................................ G01J 1/42
[52] U.S. Cl. ..................... 356/221; 352/141; 356/227
[58] Field of Search ........................ 356/218, 221, 356/224, 226, 227; 354/441–442, 445, 471, 472, 474, 475; 352/141

[56] References Cited

U.S. PATENT DOCUMENTS

| | | | |
|---|---|---|---|
| 3,727,527 | 4/1973 | Borowski et al. | 356/227 X |
| 3,883,252 | 5/1975 | Ando | 356/227 |
| 4,132,985 | 1/1979 | Kitaura | 340/347 AD |
| 4,262,997 | 4/1981 | Yuasa | 354/23 D |
| 4,291,979 | 9/1981 | Yuasa et al. | 356/218 |
| 4,401,386 | 8/1983 | Yuasa et al. | 356/226 |
| 4,656,466 | 4/1987 | Yoshida et al. | 340/716 |
| 4,671,655 | 6/1987 | Heard | 356/227 |
| 4,748,468 | 5/1988 | Fujino et al. | 354/402 |

FOREIGN PATENT DOCUMENTS

| | | | |
|---|---|---|---|
| 44525 | 2/1991 | Japan | 356/218 |

Primary Examiner—Robert J. Warden
Assistant Examiner—Krisanne M. Thornton
Attorney, Agent, or Firm—J. E. McTaggart

[57] ABSTRACT

In a handheld incident light meter instrument, a custom LCD panel provides both a digital readout and a bar graph array which simulates an analog meter but uses no moving mechanical parts and which may be operated in a choice of modes: bar, floating zone or dedicated. Unusual accuracy and stability over a wide dynamic range, from 0.1 to over 50,000 footcandles, are achieved in a novel analog photo-amplifier portion having a linear autoranging preamplifier, an averaging integrator and a temperature-compensated log converter, driving an IC analog-to-digital converter connected to a microprocessor programmed to operate in a choice of modes to operate the LCD via a driver to display light readings according to commands entered via a set of ergonomic user controls. Battery condition is displayed continuously. The digital readout may be backlit for low ambient light level. Two versions each provide special operating modes in addition to a regular illuminance mode in which incident light readings are displayed in a choice of footcandles or lux with up to 5 sequential readings storable on display. A first version, the "Cinemeter II", directed particularly to cinematography, accepts user-entered data such as film speed, shutter speed, shutter angle and lens filters, and displays movie camera f-stop settings automatically calculated from the light reading. A second version, the "Lighting Director", for evaluating illuminance in various environments including movie-making, stage lighting, general photography and architectural illumination, etc., can display light readings as +/− deviation from a preset target value, with optional audible indication.

25 Claims, 5 Drawing Sheets

LCD BARGRAPH MOTION PICTURE LIGHT METER

This is a continuation of application Ser. No. 07/883416, filed May 14, 1992, now abandoned.

FIELD OF THE INVENTION

The present invention relates to the field of photography and more particularly, light meter instruments of the incident type directed particularly to the field of cinematography, i.e. professional motion picture filming operations.

BACKGROUND OF THE INVENTION

In the general field of photography, wherever a still or movie camera is used there is always a need to measure the light value. For popular photography including video camcorders and even professional camera work in the field such as news coverage, the light meters used are almost always of the reflective type which senses the light, reflected back from the subject, and in many cameras some or all of the camera settings are then made automatically. This mode is popular because of its convenience since the light meter is typically built into the camera, however since it depends on a single light reading which is an average of various reflectance value highlights in the subject as well as in the background, it is inherently critical regarding its directivity pattern and is necessarily a compromise, subject to errors and unpredictable results particularly in the common condition where there are large variations in the light throughout the field of view.

Cinematography requires detailed accurate measurement and close control of lighting due to the high standards sought and the limitations of photographic film, consequently light meters used in cinematography are typically of the incident type rather than the more common reflected light type.

In the best practice of professional cinematography, before commencing filming, the scene is in effect "mapped" by taking number of incident light readings at various points in the field of view including both the subject and the surrounding background. Before filming, the cinematographer, having determined the field of view and set up the lighting initially, carries a hand-held incident light meter while moving around in the vicinity of the subject where he measures the incident light at several points in the field of view, usually seeking points of maximum or minimum light level. These readings are analyzed, and may be used initially to adjust and improve the lighting and finally to determine the correct camera settings. Typically a required f-stop setting is calculated, based on well-known photographic formulae, from the combination of light reading, film speed, shutter speed, shutter angle, and the attenuation of any lens filters.

In incident light meters the light sensitive element is typically placed behind a translucent diffuser to provide a relatively broad directivity pattern in comparison to the reflective type which is typically as directional as the camera lens angle.

DESCRIPTION OF PRIOR ART

An incident light meter for this purpose, marketed under the name of "Spectra" has dominated the field of professional incident type light meters used in motion picture filming for about 40 years; it has a hemispherical white diffuser over the photo sensor, and displays illuminance in footcandles on an analog meter. The cinematographer must factor this reading along with the film speed, then determine a suitable combination of interrelated camera parameters such as the lens aperture f-stop, and the exposure time as determined by the shutter rate (frames per second) and shutter angle. As a simplification to correct for film speed, prior art incident light meter instruments have used a perforated plate to act as a calibrated light attenuator. A kit of different plates is provided, each corresponding to a particular film speed, from which one is to be selected and inserted in front of the light meter sensor element. Such an artifice typically yields a suggested f-stop setting which is valid only for a particular "standard" shutter rate and angle (typically 24 frames per second, 180 degree angle); for other shutter rates (which may range from 2 to over 300 frames/second) and/or shutter angle settings (which may range from 45 to 205 degrees), further computation must be factored manually or mentally into the interpretation of the light meter reading. Further, another variable must be factored in to allow for the attenuation of any filter placed on the camera lens.

Another inconvenience arises from the common use of two different units of light measurement: footcandles (lumens per square foot) and lux (lumens per square meter). With prior art light meter instruments calibrated in only one of these units it has often been necessary to apply a conversion factor externally.

Such light meters have traditionally utilized a mechanical analog meter movement as the display medium. Such mechanical movements have proven to be a frequent source of problems such as sticking, inaccuracy or failure, due to the inherent vulnerability of typical structure including delicate spiral hair springs and jeweled pivots.

The light sensitivity available on such instruments, typically 4 footcandles at the first calibration mark, has become entirely inadequate, by at least an order of magnitude, for present day high speed film which often requires measuring illuminance in small fractions of a footcandle.

While light meter instruments of the reflective and general purpose incident type have received benefit from technological development in a large sales market, there has been a lag in the development of incident light meter instruments directed particularly to professional cinematography which is addressed by the present invention.

OBJECTS OF THE INVENTION

It is a primary object of the present invention to provide a hand held incident light meter instrument, directed to professional cinematography, having a solid state electronic display medium simulating an analog meter but having no mechanical moving parts.

It is a further object to provide a digital readout capability to supplement the simulated analog display.

It is a further object in an improved light meter to provide the capability of accurate measurements of average illuminance from both continuous and chopped light sources over a wide dynamic range from a fraction of a footcandle to over 50,000 footcandles.

It is an object to provide an embodiment of the invention directed particularly to automatically correlating incident light readings with movie camera settings, in particular to provide a mode which automatically calculates and displays f-stop settings derived from the light readings taken together with user-entered data such as film speed, camera shutter speed, shutter angle and lens filter attenuation, including convenient user means for entering such data.

It is an object to provide an embodiment of the invention directed particularly to measuring illuminance and having the capability of storing and displaying a plurality of successive readings.

It is an object to provide a rugged, easy to use, selfexplanatory light meter which will overcome the reticence of most professional cinematographers to trust modern electronic meters.

SUMMARY OF THE INVENTION

The above objects have been met by the present invention of a hand-held incident light meter instrument which utilizes a custom electronic LCD (liquid crystal display) having, in addition to a digital readout and symbolic indications, a bar/graph array which simulates analog level indication but eliminates the moving parts of conventional mechanical light meters. A wide dynamic range of accurate measurement of illuminance and the ability to average chopped light are accomplished by specially processing the photo-sensor signal though a linear auto-ranging preamplifier stage and then performing logarithmic conversion followed by ADC (analog-to-digital conversion), with dual preamp and ADC stages for temperature stabilization. A microcomputer connected to the display portion and the ADC by an IC-interface bus controls the measurement and display including preamp auto-ranging and execution of user commands such as data entry and selection of operating and display modes and selection of units: footcandles or lux.

A first embodiment, directed particularly to cinematography, provides a user-elected display either in the form of illuminance readings (in footcandles or lux) or in the form of a camera setting such as f-stop computed automatically from light readings and user data input.

A second embodiment, directed particularly to illuminance evaluation, provides optional capability of comparing a current light reading with preset target values and offers further options of audible indication and storage of several sequential readings.

BRIEF DESCRIPTION OF THE DRAWINGS

The above and further objects, features and advantages of the present invention will be more fully understood from the following description taken with the accompanying drawings in which.

DETAILED DESCRIPTION

Figure 1:
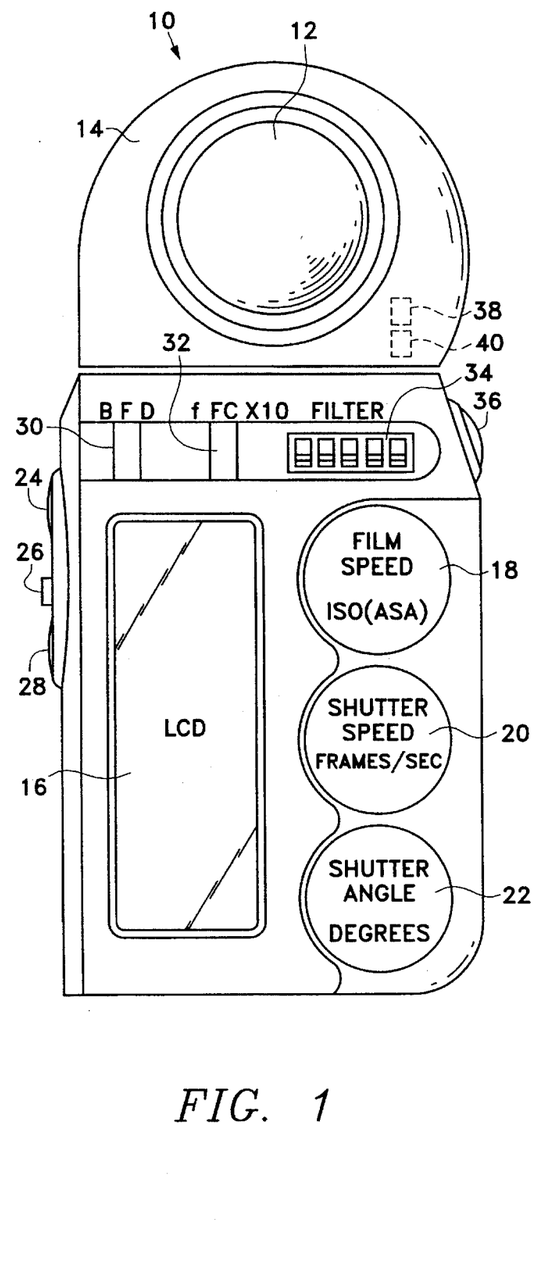
FIG. 1 is a front view of an incident light meter instrument of the present invention in a first embodiment directed particularly to cinematography.

FIG. 1 is a front view of a light meter instrument 10 in accordance with present invention in a first embodiment, known as "Cinemeter II" having user-oriented features addressed particularly to cinematographic requirements such as the measurement of incident light and the setting up of movie cameras with regard to lighting conditions.

The incident light is sensed by an internal light-sensitive element located behind a translucent diffuser 12 in a head portion 14 in the upper region of instrument 10. Diffuser 12 is preferably configured in a hemispherical shape to make the pickup pattern relatively non-directional. The head portion 14 is preferably made rotatable throughout a wide angle (e.g. 270 degrees), detented at the normal central position shown.

In the main body region of instrument 10, a rectangular display panel 16 to the left contains a custom LCD (liquid crystal display) having multiple independently addressable segments providing alphanumeric, symbolic and bar graph markings.

Three adjustment knobs are located in a partially recessed region to the right; each operates a 24 position detented switch for user entry of camera operational data to the meter 10 as follows:

FILM SPEED knob 18, to be set to the speed of the film emulsion being used, is marked in ISO units (also known as ASA units) and is made to increment in steps of ⅓ stop, i.e. 12, 16, 20, 25, 32, 40, 50, 64, 80, 100, 125, 160, 200, 250, 320, 400, 500 640, 800, 1000, 1250, 1600, 2000, 2500;

SHUTTER SPEED knob 20, to be set to the shutter speed, is marked in units of frames per second and is made to increment in steps of ⅓ stop, i.e. 2, 2.5, 3, 4, 5, 6, 8, 10, 12, 16, 18, 25, 32, 36, 48, 64, 72, 96, 120, 144, 200, 240, 300, 375 frames per second; and SHUTTER ANGLE knob 22, to be set to the camera shutter angle, is marked in degrees and made to increment in steps of ⅑ stops i.e. 45, 48, 52, 55, 60, 65, 70, 77, 83, 90, 96, 103, 109, 115, 123, 130, 138, 144, 154, 163, 171, 180, 193, 205 degrees.

On the left hand side of the light meter instrument 10 are located three controls:

RESET pushbutton switch 24, operating in a momentary mode, will clear previously memorized readings;

ON/OFF slide switch 26 provides on/off control of the main operating power of the instrument 10, which is received from an internal battery; and BACKLIGHT slide switch 28 enables back lighting of panel 16 to be turned on and off.

Along the body portion just beneath head portion 14 are two three-position slide switches 30 and 32, and an array 34 of five adjacent two-position toggle switches.

The three positions of switch 30 are designated B/F/D (Bar mode, Floating zone mode and Dedicated zone mode), and the three positions of switch 32 are designated f/FC/X10 (f-stop, footcandles and footcandles multiplied by 10).

In switch array 34, designated FILTER, the five individual toggle switches provide decreases in f-stop value of ⅓, ⅔, 1, 2, and 3 stops respectively from left to right; the filter function of these switches is made to be additive in nature (e.g. 1 and ⅓=1 ⅓).

On the right side of instrument 10, a pushbutton 36 designated READ, operating in a momentary mode from thumb pressure of the user holding the instrument 10, activates the read capabilities of the instrument 10. The reading, displayed on panel 16, will be constantly updated until pushbutton 36 is released, at which time the last reading will be held on the display.

Located internally in the head portion 14 and accessible through a rear cover are two display mode selector switches 38 and 40, each having two positions: FC or LUX, and f or ⅙f respectively.

Figure 2:
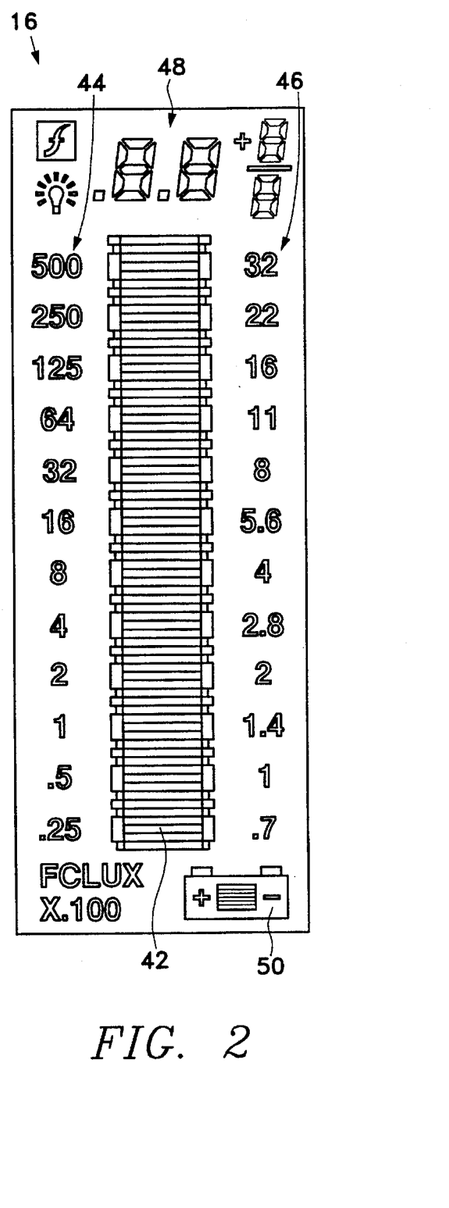
FIG. 2 is an enlarged front view of the display panel of the light meter of FIG. 1 showing the locations of the alphanumeric, symbolic and bar graph array markings.

FIG. 2 is an enlarged front view of the LCD panel 16 of FIG. 1 showing the locations of the alphanumeric, symbolic and bar graph array markings representing the total display artwork. At any point in time, only those LCD segments selected for activation by the processing and driving circuitry will be displayed, while the balance of the LCD segments will remain deactivated and thus will remain undisplayed.

A central major bar graph array 42, having a vertical column of seventy horizontal bars for indicating illumination level, is flanked on the left by a column 44 of numerals ranging from 0.25 to 500 along with corresponding alternatively tall and short calibration markings adjacent to the array 42: when switch 32 (refer to FIG. 1) is set to the FC or x10, these numerals appear and the bar graph array 42 indicates light readings in footcandles or lux. Depending on which of the two unit systems is selected via internal switch 38 (refer to FIG. 1), the appropriate marking (FC or LUX) appears at the lower left region of display panel 16, along with an appropriate scaling factor immediately beneath, e.g. X.1, X10 or X100, whenever the current scaling factor is other than unity.

Bar graph array 42 is flanked on the right with a column 46 of f-stop numerals ranging from 0.7 to 32 along with corresponding calibration markings (similar to those on the left): when switch 32 (refer to FIG. 1) is set to the f-stop position the dynamic bar display on array 42 becomes calibrated in f-stop units in column 46.

A digital readout 48 above array 42 also displays f-stop readings in numeric form in either of two modes as selected by internal switch 40 (FIG. 1): f and ⅙f. In the f mode the digital readout 48 reads in real ⅓ f-stops (e.g. f 5.8), and in the ⅙f mode the display reads in f-stops plus fractions in increments of ⅙f (e.g. f 5.6+⅓). If the reading falls outside the instrument's range of capability, error is indicated by display of a letter "E".

Readout 48 can be illuminated with a backlight by actuating the BACKLIGHT switch (28 FIG. 1). When the backlighting is switched on, the light bulb symbol immediately below the f symbol at the left will be activated to indicate that the backlight is on, typically when the user is in semi-darkness; this helps preserve battery life by reminding the user to switch off the backlighting under the usual light viewing condition where the legibility from ambient light alone is sufficient and thus backlighting is redundant.

To the right along the bottom of panel 16, a symbol representing a battery includes a small array 50 operating in a bar graph mode for indicating battery condition, which is continuously monitored whenever the instrument is operated. As the battery voltage decreases, the bar graph displayed on array 50 diminishes until only one bar remains; this one bar indicates that the battery should soon be replaced. When only the last bar remains, it will flash slowly to call attention to the depleted battery.

Referring now to both FIGS. 1 and 2, to use the instrument 10 in its primary function to determine motion picture camera f-stop settings the display mode of digital readout 48 is selected by internal switch 40 (f/1/6f), the display mode of array 42 is set by B/F/D switch 30, the operating mode is set to the f-stop mode by setting the f/FC/X10 switch 32 to "f", the value of any camera lens filter is set on switch bank 34, the ISO (ASA) rating of the film in use is set on dial 18, the camera shutter speed is set on dial 20 and the camera shutter angle is set on dial 22. The unit is powered by actuating switch 26, and the instrument 10 is held in the field of view at the point to be measured, e.g. in front of the subject, facing toward the camera. Then, when the READ pushbutton 36 is depressed, the calculated f-stop reading is displayed on array 16 and readout 48.

To use the instrument 10 as an incident illumination meter, the f/FC/X10 is set to either FC or X10 depending on the light sensitivity required by the lighting conditions, and a reading is taken in the same manner as described above for the f-stop: the incident illumination reading will appear displayed on array 16 in FC or LUX units as selected by internal switch 38.

When B (Bar graph mode) is selected on three position switch 30, the reading is displayed on array 42 in the bar graph mode: as a reading is taken by depressing the READ push-button 36, a column of energized bars extends upward from the bottom of the scale to the highest activated bar segment which indicates the reading; the energized column of bars varies in height as it follows changes in light reading. If a reading exceeds the display range, then the top three bars will blink on and off together to indicate an out-of-range reading; the three bars will stop blinking when the reading returns to an acceptable range.

When F (Floating zone mode) is selected on switch 30, an initial light reading is indicated as a single flashing bar; then as the light intensity varies because of user movement or natural scene changes, the display will expand to become a cluster of bars representing at the extremes the minimum and maximum values of the varying light intensity. The current and/or final reading is indicated by a blinking bar within the floating zone. If the reading in the Floating zone mode goes off the top or bottom of the bar graph array 42, then the last three bars will blink together to indicate a reading outside the range of the scale.

When D (Dedicated mode) is selected on switch 30, light readings are displayed in a single bar mode; i.e. only one of the bars is activated at any time, and it appears to move up and down on array 42 as the light reading fluctuates. When the READ pushbutton 36 is released, the displayed measurement value becomes frozen and the last activated single bar remains on display. This process can be repeated five times and each measurement will be remembered and displayed as a single bar at the appropriate position. A sixth measurement can be taken, but it will be erased the next time the READ button 36 is actuated.

Figure 3:
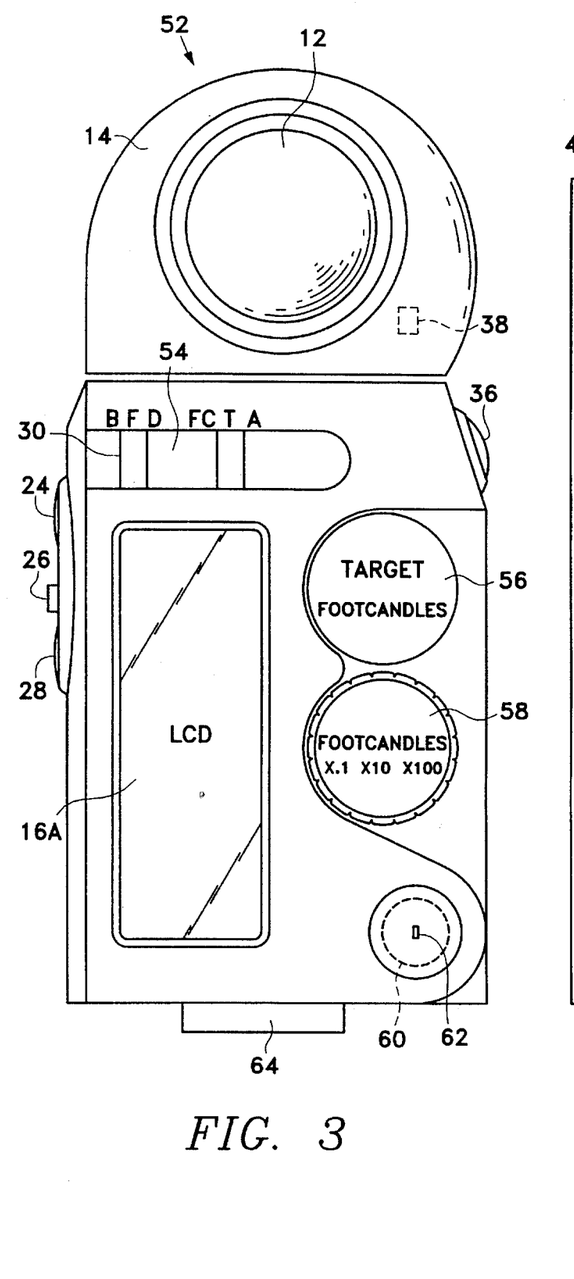
FIG. 3 is a front view of an incident light meter instrument of the present invention in a second embodiment directed particularly to illuminance evaluation.

FIG. 3 is a front view of a light meter instrument 52 according to the present invention in a second embodiment known as the "Lighting Director" fundamentally similar to the first embodiment but having user-oriented features directed particularly to comprehensive evaluation of illuminance and is well suited to various environments and activities including movie-making, stage lighting, general photography and architectural illumination, etc.

The following items of the FIG. 3 embodiment are similar in form and function to those items having the same reference number, as described above in connection with FIG. 1:

the hemispherical diffuser 12 and associated light-sensitive element, head portion 14, FC/LUX selector switch 38 located within head portion 14, RESET pushbutton 24, ON/OFF slide switch 26, BACKLIGHT slide switch 28, READ pushbutton 36, and three-position slide switch 30, designated B/F/D (Bar/Floating zone/Dedicated zone).

Above panel 16A to the right of switch 30, is a three-position slide switch 54, designated FC/T/A (Footcandles, Target, Audible).

Toward the right are two selector dials: TARGET dial 56 marked in footcandles, and dial 58 designated FC/X.1/X10/X100 (Footcandles, multiply by 0.1, 10 and 100).

Below dial 58, an audio transducer 60 is mounted behind a curved raised portion of the housing having an aperture 62 for sound emission.

A standard threaded tripod adaptor plate 64 is attached at the bottom of the housing.

Figure 4:
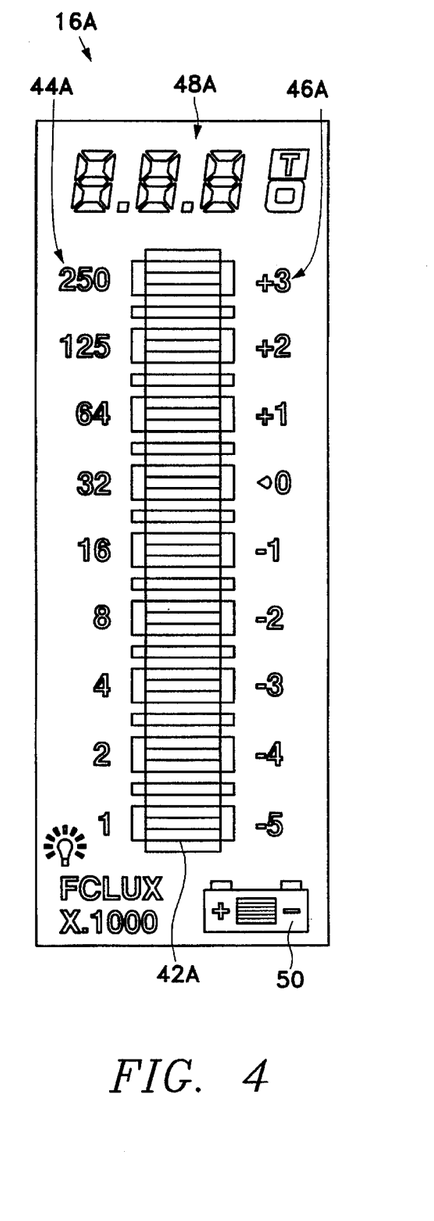
FIG. 4 is an enlarged front view of the display panel of the light meter of FIG. 3 showing the locations of the alphanumeric, symbolic and bar graph array markings.

FIG. 4 is a front view of the custom LCD panel 16A of FIG. 3. Panel 16A is generally similar to panel 16 of FIG. 1 in size, shape and generic construction. Bar graph array 42A and digital readout 48A are generically similar to corresponding items 42 and 48 in panel 16 (FIG. 1) but differ for example in the number of digits (four) and bar graph segments (fifty four), and panel 16A is marked differently as follows: the numeric scale 44A to the left of the bar graph array 42A ranges from 1 to 250 and serves to indicate either measured or target light values in units of footcandles or lux (as selected by switch 38, FIG. 3), the numeric scale 46A to the right ranges from −5 to +indicating deviation from a selected target value, digital readout 48A has three digits and is followed by indication T for the target mode. In the lower left corner is the bulb symbol for indicating when the backlight is on, and indications for FC LUX and associated multiplier.

Referring now to both FIGS. 3 and 4, to use the light meter instrument 52 to make illuminance measurements, assuming footcandles has been selected as the units system by internal switch 38 (FC/LUX), the desired display mode of array 42 is selected by switch 30 (Bar/Floating zone/ Dedicated zone), and the operating mode is set by switch 54 (Footcandles/Target/Audible). When the instrument 52 is suitably located in the region to be measured, upon depressing READ pushbutton 36, the light reading will be indicated in footcandles on both the bar graph array 42A as calibrated by scale 44A to the left, and numerically on the digital readout 48A.

To compare light readings relative to a preset target, the operating mode is set by the user to Target by switch 54, and the target value in footcandles is entered by the user on dials 56 and 58. Then, upon actuating READ pushbutton 36, the light reading will be displayed as a +/− deviation from the set target value as indicated on bar array 42A as calibrated on scale 46A on the target side to the right, and numerically on the digital readout 48A.

Audible indication may be added to the preceding comparison mode by setting switch 54 to position A: then in addition to the readings on array 42A and readout 48A, a sound will be generated from transducer 60 whenever the current reading is within +/− one bar of the preset target reading displayed on array 42A.

Figure 5:
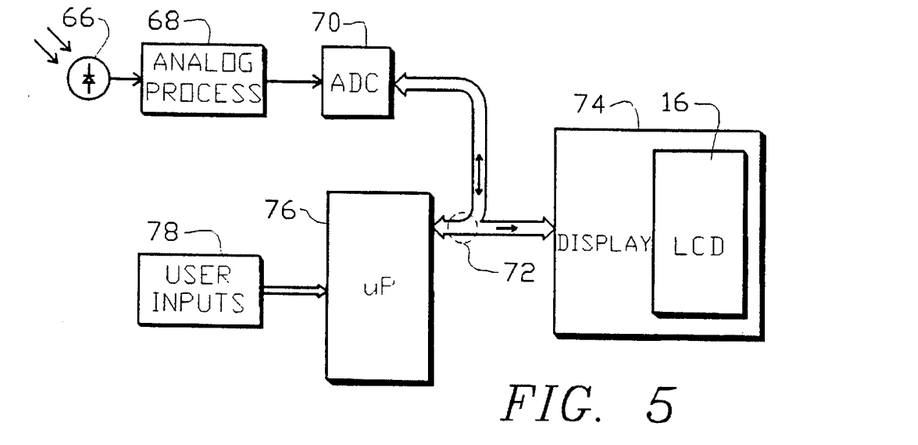
FIG. 5 is a simplified functional block diagram of electronic circuitry associated with FIGS. 1–4.

FIG. 5 is a simplified overall functional block diagram of the electronic circuitry associated with both of the embodiments described above in connection with FIGS. 1–4. The light sensitive element 66 provides a photo signal input to an analog processor 68 which converts the signal to an amplified logarithmic form which is then applied to an ADC (analog-to-digital converter) 70.

The ADC 70 and a display portion 74 which includes LCD panel 16 (FIG. 2 or 16A in FIG. 4) are connected via an IC-interface data/control bus 72 to microprocessor 76, which receives user-generated data and commands via a set of user inputs 78 which includes the various user controls such as switches, dials, pushbuttons along with associated comparator circuitry. Communicating via bus 72, microprocessor 76 acts on light measurement data received from ADC 70 and on data and commands from the user inputs 78 to operate the display portion 74 and LCD 16 accordingly.

Figure 6:
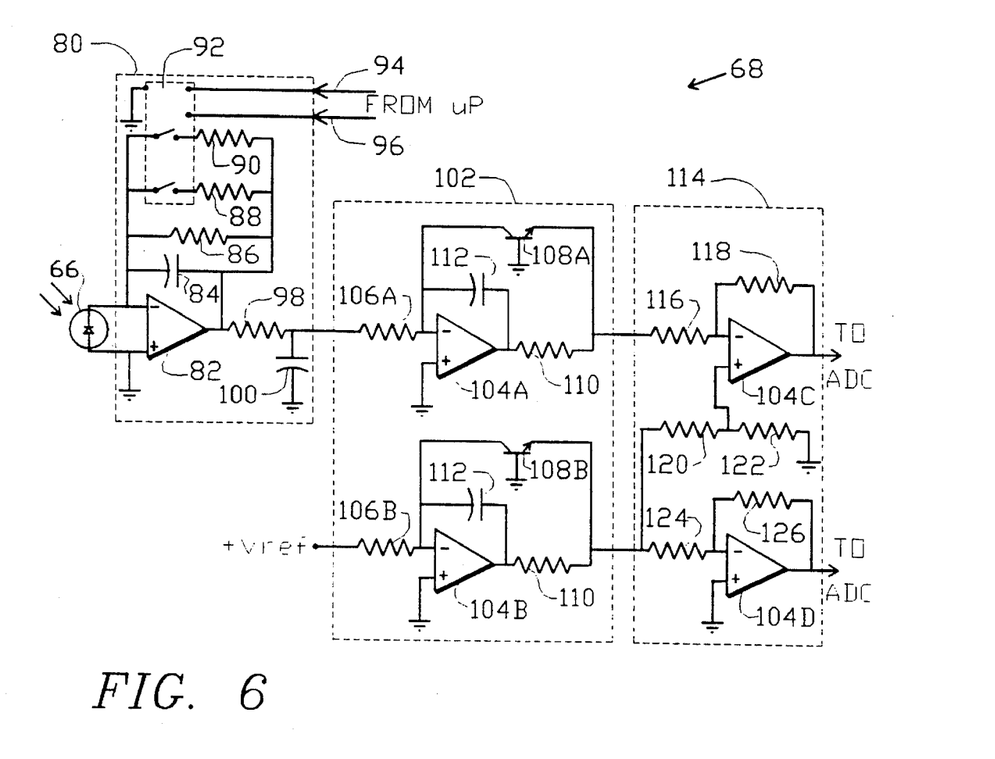
FIG. 6 is a schematic diagram of the analog processor portion of the subject matter of FIG. 5.

In FIG. 6, which is a detailed schematic diagram of the analog processor 68 of FIG. 5, the light sensitive element 66 (located in the head portion 14, FIGS. 1 and 3) is implemented as a silicon photo diode. The photo signal from element 66 is first applied to a linear photo amplifier stage 80 in which an op-amp 82 has in its negative feedback path two fixed components, capacitor 84 (which provides a high frequency rolloff) and resistor 86 connected in parallel. Also in the negative feedback path are resistor 88 and resistor 90, which are independently switchable by relay means 92, implemented as an analog switching IC, controlled through lines 94 and 96 from the microprocessor (76, FIG. 5) so as to provide auto-ranging, i.e. automatic selection of one of three gain ranges as appropriate for the prevailing light level. This circuit provides highly accurate and stable light measurement over a six decade dynamic range: from 0.01 footcandles to over 50,000 footcandles.

A low pass filter formed from resistor 98 and capacitor 100 acts as an integrator to average the measured light value, which is important in many instances encountered where the light is chopped rather than continuous, such as in television, fluorescent lighting and non-incandescent sources including some projectors. Such chopped light sources need to be averaged prior to log conversion to eliminate errors in the resulting light measurements.

In the log converter stage 102, logarithmic response is accomplished by the negative feedback circuit around op-amp 104A, including input resistor 106A, bipolar transistor 108A, resistor 110, and capacitor 112.

In a duplicate circuit including op-amp 104B, all corresponding components are identical with those connected to op-amp 104A; however, input resistor 106B is connected to a stable positive reference voltage supply, e.g. +5 volts, and thus op-amp 104B receives the reference voltage as input and serves to provide a temperature signal for canceling temperature-dependency of the log converter circuitry around op-amp 104A, particularly the base-emitter junction voltage of transistor 108A. Transistors 108A and 108B are mounted on a common substrate in a transistor array IC to ensure thermal matching and tracking.

In conditioning amplifier 114, op-amp 104C, connected as a differential amplifier, receives at its inverting input the log photo signal via input resistor 116 and receives at its non-inverting (+) input a d.c. temperature drift signal from op-amp 104B, via a voltage divider formed by resistors 120 and 122. Thus temperature drift effects of log converter stage 102 are substantially canceled and op-amp 114A delivers a stabilized photo signal to the ADC to be further processed for display purposes. The voltage gain of op-amp 114A is set by the ratio of resistor 118 in the negative feedback path and input resistor 116.

Op-amp 104D with negative feedback applied by resistors 124 and 126 forms an inverting amplifier supplying a temperature-dependent d.c. signal to the ADC where it is converted to digital form and transmitted as serial temperature data via bus 72 to the microprocessor where it may be utilized to apply correction factors as required, for example to compensate for the overall effects of ambient temperature variations on the gain of the analog portion and to compensate for the voltage drive levels to the LCD which require temperature compensation.

Analog processor 68 of this invention is believed to set new standards of accuracy, sensitivity and stability in the light meter field, largely due to the following departures from conventional practice: (a) the introduction of the linear photo preamplifier stage 80, interposed between photo sensor element 66 and the log conversion stage 102 as shown as opposed to conventional practice of direct log conversion of the light sensor signal with preamplification, (b) averaging the photo signal ahead of log conversion by the low pass filter (resistor 98 and capacitor 100), facilitated by the linear preamplification of item (a), and (c) the balanced method of temperature-compensating the log converter, which is inherently advantageous over conventional approaches which utilize unmatched elements such as thermistors.

Figure 7:
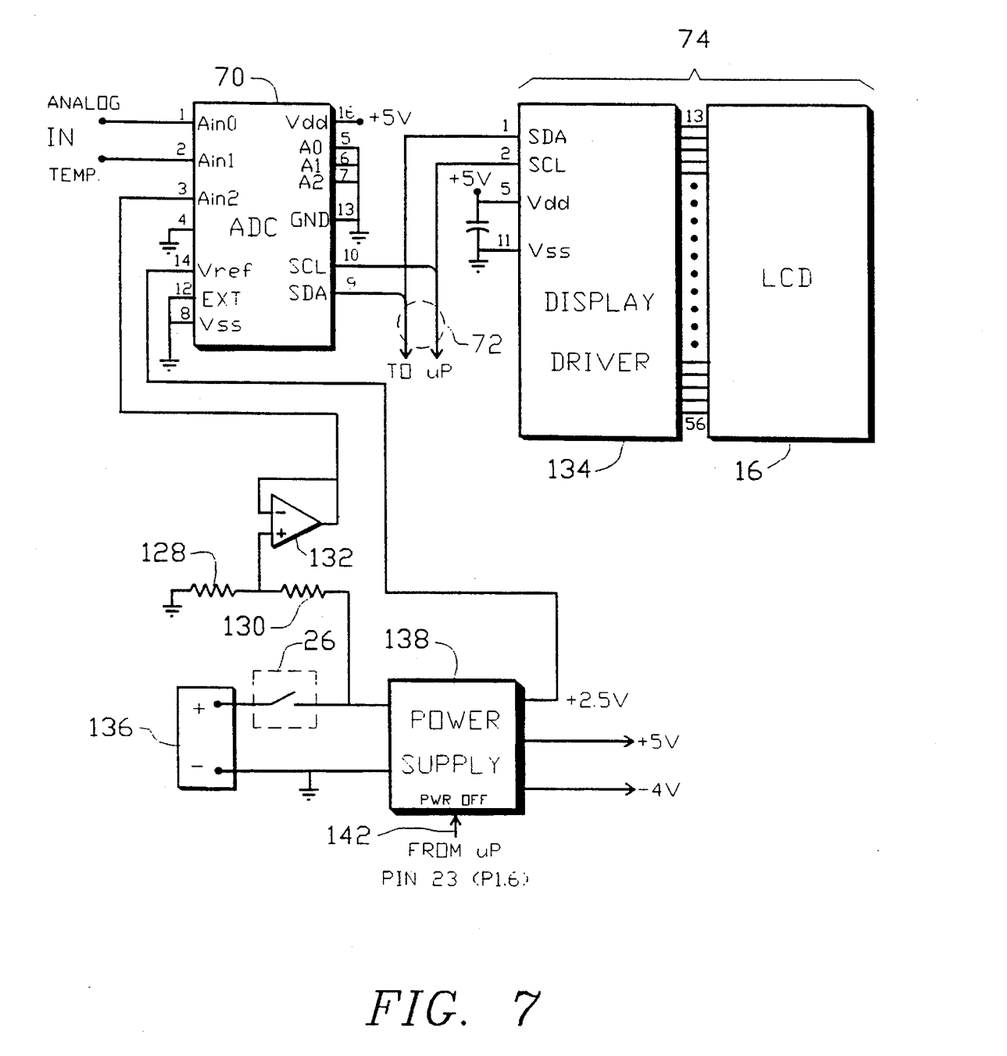
FIG. 7 is a schematic diagram of the ADC and display portions of the subject matter of FIG. 5.

The schematic diagram of FIG. 7 includes ADC 70 and display portion 74 of FIG. 5 along with power supply and battery condition monitoring circuitry. ADC 70 is implemented as an IC providing three separate analog input channels: a first input at pin 1 (Ain0) receives the log photo signal (from op-amp 104C, FIG. 6); a second input at pin 2 (Ain1) receives the temperature signal (from op-amp 104D, FIG. 6) and a third input at pin 3 (Ain2) receives a signal proportional to battery voltage from a voltage divider formed by resistor 128 and resistor 130 via a unity gain buffer formed by op-amp 132. These three positive d.c. signals become time-multiplexed as serial output transmitted to the microprocessor via the two line IC-interface bus 72.

Display driver 134, implemented as an IC, is connected as shown to corresponding display segments of the custom LCD panel 16, and is adapted to drive the segments in accordance with the serial display data received from the microprocessor via bus 72.

An onboard battery 136 is connected via ON/OFF switch 26 to power supply 138 in which linear feedback circuitry provides a closely regulated +5 volt supply and a standard type IC operating as a simple charge-pump converter generates a less closely regulated −4 volt supply. These two supply voltages are used generally in the various functional blocks of the system. In addition, a precision +2.5 volt source regulated by a band-gap reference diode for internal use in power supply 138 is also supplied to ADC 70 as a reference voltage.

The battery voltage signal from buffer 132 is converted by ADC 70 to digital form and transmitted as serial data via bus 72 to the microprocessor 76 which derives display data which is transmitted via bus 72 to the display section 74. There it is processed by display driver 134 to actuate a small bar graph (array 50 as described previously in connection with FIGS. 2 and 4) as a display which continuously monitors the battery voltage. Thus, as the battery becomes depleted, timely warning is provided for battery replacement. The end of battery life is typically rated at 5.4 volts; the regulation in power supply 138 is designed to provide operation from a battery voltage as low as 5.05 volts.

Power supply 138 is provided with a shutoff control terminal 142 connected to the microprocessor to automatically shut off the power when the instrument is not actives to preserve battery life.

Figure 8:
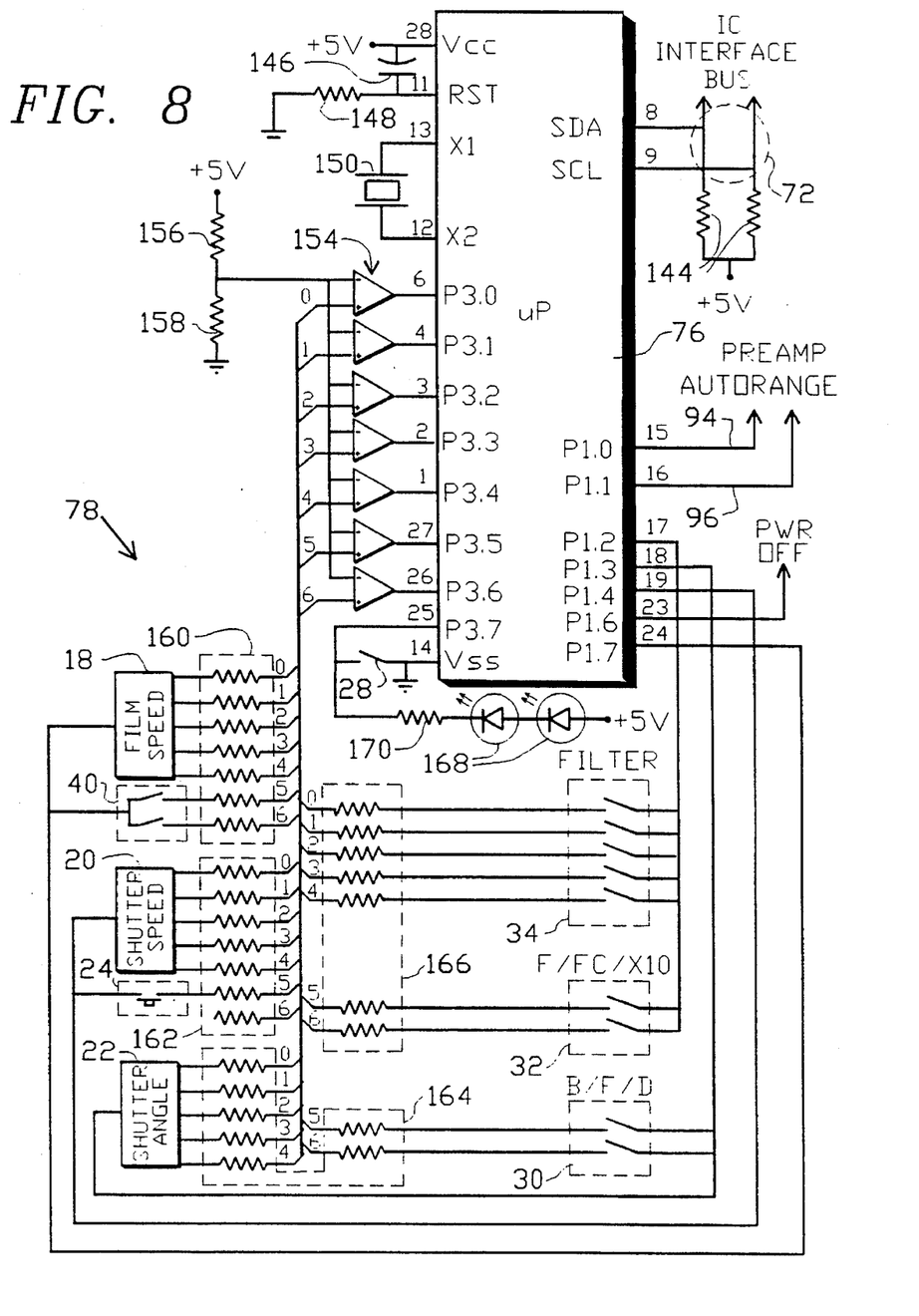
FIG. 8 is a schematic diagram of the microprocessor and user input portions of the subject matter of FIG. 5.

FIG. 8 is a schematic diagram of the microprocessor 76 and user input portion 78 of FIG. 5. Microprocessor 76 is implemented as a type 87C751. On the right hand side of microprocessor 76 bus 72 is connected to terminals 8 (SDA) and 9 (SCL) which are biased by a pair of pullup resistors 144 connected to +5 volts.

Terminals 12 (P1.0) and 16 (P1.1) are connected via lines 94 and 96 to operate the autoranging control switch 92 (FIG. 6) in the analog processor photo preamplifier section 80 (FIG. 6).

Terminal 23 (P1.6) supplies the shutoff control signal to the power supply (138, FIG. 7) by which the microprocessor automatically shuts off the power supply after sensing a designated period of inactivity, typically 10 minutes.

On the left hand side, capacitor 146 connected between supply voltage terminal 28 (Vcc) and reset terminal 11 (RST), along with resistor 148, serve to automatically reset the microcomputer 76 at each powerup.

A crystal ceramic resonator 150, connected to terminals 12 (X2) and 13 (X3), produces a clock frequency of 4 MHz.

A comparator bank 154 of seven voltage comparators is implemented by two ICs; the comparator outputs are connected to ports P3.0–P3.6 as shown, their inverting inputs are connected in common to a bias reference from the junction of resistors 156 and 158, while the non-inverting (+) comparator inputs numbered 0–6 in the drawing are connected individually to correspondingly numbered resistors in four resistor groups 160, 162, 164 and 166.

The remainder of the elements of FIG. 8 depict the set of control switches for user input (78, FIG. 5). For illustrative purposes the control set shown is that of the first embodiment: understanding of the following description may be furthered by reference back to FIG. 1 for the panel location of each control element and to the related text for its functional operation.

Terminal 17 (P1.2) is connected to the user FILTER toggle switch array 34 and to user f/FC/X10 slide switch 32; these are connected to the seven resistors of group 166 as shown.

Terminal 18 (P1.3) is connected to user B/F/D slide switch 30 and to the 24 position SHUTTER ANGLE rotary switch 22; these are connected to the seven resistors of group 164 as shown.

Terminal 19 (P1.4) is connected to the 24 position rotary SHUTTER SPEED switch 20 and to RESET pushbutton 24; these are connected to six of the resistors of group 162 as shown.

Terminal 24 (P1.7) is connected to the 24 position rotary FILM SPEED switch 18 and the two internal switches, FC/LUX switch 38 and f/1/6f switch 40; these are also connected to seven resistors of group 160 as shown.

BACKLIGHT pushbutton switch 28 is connected between ground and terminal 25 (P3.7) from which two LEDs 168, located in the display panel to serve as backlights, are energized through resistor 170. This arrangement enables the microprocessor 76 to activate the backlight indicator in the LCD whenever the backlight switch is on.

The values of all resistors in FIG. 8 are determined in design to enable the microprocessor 76 to continuously monitor the setting of each switch and to take appropriate action in response to any change of switch setting so as to cause the display to operate as commanded by the users as described above in connection with FIGS. 1 and 2.

Given the present disclosure, the detailed programming of microprocessor 76 to implement the modes of operation described above in accordance with this invention is readily accomplished by those of skill in microprocessor art through known programming techniques. Comprehensive application information and support are available from the supplier of the microprocessor 76 and other IC devices utilized. Also, in view of the high degree of overall similarity and common principles involved, the understanding of the first embodiment imparted by this disclosure is deemed more than sufficient to enable an electronic designer to make and use the second embodiment of this invention by straightforward adaptation of the principles taught and the information provided herein.

Typical component values are as follows:
Resistors:
  86:20 megohms
  88: 301k
  90: 5.11k
  106A, 106B, 128: 75k
  110:1k
  130:1 megohm
  98, 144, 148, 158: 10k
  156: 47k
  170:470 ohm Capacitors: 84:0.01 UF
  100: 2.2 uF
  112:0.047 uF
  146:10 uF
IC types: ADC 70:PCF8591
  Quad op-amps 104A–D: LM324
  Transistor array 108A,B: CA3046
  Comparators 154:2×LM339
  Display driver 134:PCF8576
  Relay 92:1H5018

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A cinematographic incident-illumination-sensing motion picture camera setup instrument for (a) sensing and registering a series of incident illumination readings made at a location of a cinematographic subject, (b) registering a group of user-entered settings of a motion picture camera for filming the subject, and (c) calculating therefrom and displaying for each illumination reading a corresponding f-stop setting for the motion picture camera, said instrument comprising:

a light-sensitive element, including a hemispheric wide-angle lens, providing an electrical signal proportional to incident illumination readings taken at the location of a subject;

user control means comprising a plurality of user data entry switch units, for independent entry of quantitative data pertaining to a respective motion picture camera parameter and each provided with direct setting indication means, such that all entered data can be observed fully and directly;

an electronic processor receiving the signal from said light sensitive element and converting the signal into corresponding stabilized logarithmic display data including motion picture camera f-stop data as calculated by said processor from the signal and the user-entered switch settings, said electronic processor including memory means for temporarily storing data from a series of readings;

a vertically-oriented solid-state electro-optical display panel, constructed and arranged to receive and display the motion picture camera f-stop display data; and a hand-held housing containing said light-sensitive element, said electronic processor, said display panel, and said user control means.

2. The cinematographic incident-illumination-sensing instrument as defined in claim 1 wherein said display panel is in the form of a liquid crystal display having a plurality of independently energizable segments forming a bar graph and having scale calibration markings including numerals adjacent to the bar graph, said processor and said user control means providing capability of operating the bar graph in any of three user-selectable display modes including a standard bar graph mode, a floating zone mode and a dedicated zone mode.

3. The cinematographic incident-illumination-sensing instrument as defined in claim 2 wherein said user control means further comprises:

a user READ switch operationally connected to said electronic processor; said READ switch, said processor and said display panel being constructed and arranged to cooperate in a manner to (a) initiate operation of said light meter instrument to display a current reading in response to actuation of said READ switch and provide a continuously updated dynamic reading displayed in the bar graph mode as long as said READ switch is held actuated, and (b) upon release of said READ switch, to continue displaying a bar representing the most recent reading and thus, with repeated actuation, and release of said READ pushbutton, to provide, displayed on said display panel, an accumulation of memorized readings up to a predetermined number of such readings; and a user RESET switch, mounted on said housing, operationally connected to said processor and cooperating therewith in a manner to cancel any display of previously memorized readings in response to actuation of said RESET switch.

4. The cinematographic incident-illumination-sensing instrument as defined in claim 2 wherein said processor is constructed and arranged to operate said display panel in a single bar mode by activating a single bar selected at any instant as having a distance from a low scale end of said display panel proportional to the reading.

5. The instrument as defined in claim 2 wherein said processor further includes means for providing overrange indication such that a bar located at a high scale end of the display becomes activated in a periodically interrupted manner whenever a reading exceeds a display limit of said array.

6. The cinematographic incident-llumination-sensing instrument as defined in claim 2 further comprising in a designated region of said display panel a digital readout displaying numerically a required moving picture camera f-stop setting as calculated by said processor from a mathematical combination of the sensed incident illumination and user-entered moving picture camera data selected from a group consisting of filtering, film speed, shutter rate and shutter angle.

7. The instrument as defined in claim 6 wherein said processor and said display panel are made to cooperate in a manner to display a character indicating on said digital readout whenever a current reading exceeds a predetermined limit.

8. The cinematographic incident-illumination-sensing instrument as defined in claim 2 further comprising:
   an onboard battery for powering said instrument;
   a segment of said display panel providing a proportional indication of battery voltage to serve as a battery condition indicator.

9. The cinematographic incident-illumination-sensing instrument as defined in claim 2 further comprising power supply shutoff means cooperating with said processor in a manner to automatically shut off operating power from said instrument after a predetermined time period of measurement inactivity.

10. The cinematographic incident-illumination-sensing instrument as defined in claim 2 wherein said processor further comprises in an analog portion:
   a linear preamplifier receiving a photo signal from said light sensitive element including autoranging capability for accommodating greater than 100 dB dynamic range of signal level;
   a integrating circuit receiving an amplified photo signal from said linear preamplifier and acting on the signal in a manner to provide an averaged photo signal so as to accurately represent chopped light; and
   a log converter circuit, receiving the averaged photo signal from said integrating circuit and converting the averaged photo signal to a log photo signal having an amplitude logarithmically proportional to the averaged photo signal;
   whereby said log photo signal is made available for purposes of providing an amplitude indication with a logarithmic response displayed on the bar graph.

11. The light meter instrument as defined in claim 10 wherein said processor further comprises:
   an analog-to-digital converter, receiving the log photo signal from said log converter stage via a buffer stage and converting the log photo signal to a serial digital photo signal;
   a display driver, incorporated in said display portion, having a plurality of driving devices operationally connected to individual segments of said display panel; and
   a microprocessor, connected operationally to said ADC and to said display driver, receiving user commands from said user input means and accordingly causing said display panel to visually represent said serial digital photo signal in, at least, a simulated analog manner.

12. The cinematographic incident-illumination-sensing instrument instrument as defined in claim 11 further comprising, in said analog portion:
   a first operational amplifier device, in said log converter circuit, having in a negative feedback path a first transistor connected in a grounded base configuration;
   a differential buffer stage receiving the log photo signal at a first differential input terminal and providing input to said ADC;
   a temperature-sensing circuit receiving as input a positive reference d.c. voltage and supplying, as output, a temperature-compensating signal applied to a second differential input terminal of said buffer stage, said temperature-sensing circuit having a configuration duplicating that of said log converter circuit including, in a negative feedback path of a second operational amplifier, a second transistor, in a grounded base configuration, sharing a substrate in common with said first transistor, so as to provide from the buffer stage a log photo signal wherein temperature drift effects inherent in said log converter, particularly in base-emitter junction voltage of the first transistor, are substantially canceled by matching temperature drift effects inherent in said temperature-sensing circuit.

13. The cinematographic incident-illumination-sensing instrument as defined in claim 1 wherein said processor, said display panel and said user control means are made to cooperate in a manner to operate said instrument in at least an f-STOP mode wherein said processor calculates a required f-stop setting from sensed light intensity taken along with cinematographic data selected from a group consisting of film speed, movie camera shutter speed, shutter angle, and lens filter attenuation entered to said processor via said control means, and causes the calculated f-stop setting to be displayed dynamically on said display panel.

14. The cinematographic incident-illumnation-sensing instrument as defined in claim 1 wherein said plurality of user data entry selector switch units comprises:
   a detented rotary film speed selector switch unit having user entry means settable in predetermined increments of ISO units and marked accordingly;
   a detented rotary shutter repetition rate selector switch unit having user entry means settable in predetermined increments of frames per second and marked accordingly;
   a detented rotary shutter angle selector switch unit having user entry means settable in predetermined increments of degrees and marked accordingly; and
   a filter deployment switch unit having user entry means settable in predetermined fractional f-stop increments and marked accordingly.

15. The cinematographic incident-illumination-sensing instrument as defined in claim 14 wherein:
   said film speed selector switch unit is made to have 24 settings ranging from 12 to 2500 ISO units in ⅓ stop increments;
   said shutter repetition rate selector switch unit is made to have 24 settings ranging from 2 to 375 frames per second in ⅓ stop increments;
   said shutter angle selector switch unit is made to have 24 settings ranging from 45 to 205 degrees in ⅙ stop increments; and
   said filter deployment switch unit comprises a side-by-side group of five two-position slide switches with capability of entering respectively additive filter values of ⅓, ⅔, 1, 2 and 3 stops thus providing a selection from 22 filter values ranging from 0 to 7 stops in ⅓ stop increments.

16. The cinematographic incident-illumination-sensing instrument as defined in claim 1 wherein said display panel comprises an electro-optical vertical bar graph display including associated adjacent scale calibration markings and numerals, enabled to display the calculated moving picture camera lens f-stop data.

17. The cinematographic incident-illumination-sensing instrument as defined in claim 15 wherein said display panel comprises a numeric electro-optical display enabled to display the calculated moving picture camera lens f-stop data.

18. The cinematographic incident-illumination-sensing instrument as defined in claim 17 further comprising a numeric display mode selector switch operating in cooperation with said processor and said numeric electro-optical display in a manner to provide user selection between a decimal mode and a fractional mode of numeral display.

19. The cinematographic incident-illumination-sensing instrument as defined in claim 14 wherein said display panel comprises:

an electro-optical vertical bar graph display including associated adjacent scale calibration markings and numerals, constructed and arranged to display the calculated lens f-stop data; and an electro-optical numeric display, constructed and arranged to display the calculated lens f-stop data.

20. The cinematographic incident-illumination-sensing instrument as defined in claim 19, having a further capability of displaying luminance values, further comprising a function selector means constructed and arranged to cooperate with said processor and said bar graph display in a manner to enable user selection between a cinematographic operating mode of said instrument wherein a calculated f-stop setting is displayed on said bar graph display and a luminance mode thereof wherein a luminance value is displayed on said bar graph display, said bar graph display having a set of luminance calibration markings adjacent on a first side thereof and a set of f-stop markings adjacent on a second and opposite side thereof.

21. The cinematographic incident-illumination-sensing instrument with incident-illumination indicating capability as defined in claim 20, wherein said function selector means comprises a three position user switch having a first position deploying the cinematographic mode, a second position deploying the incident-illumination mode operating at a primary light sensitivity and a third position deploying the incident-illumination mode operating at a secondary light sensitivity that is an integer multiple of the primary light sensitivity.

22. The cinematographic incident-illumination-sensing instrument as defined in claim 1 wherein said display panel comprises:

a vertically oriented liquid crystal display panel driven from said processor, having a plurality of independent display segments including numeric and symbolic characters, a vertical column of horizontal segments each independently energizable from said electronic processor in a manner to visually indicate amplitude parameters related to sensed illumination in accordance with the display data, said display panel being made to operate in a plurality of display modes, as selected by a display mode switch, including a real time bar graph mode wherein a current reading is indicated dynamically as a bar of variable height formed from adjacent energized segments extending vertically upward from a lowest segment of the column, relative amplitude thus being indicated by the height of the bar, the display modes including at least one additional mode which provides a display of one or more readings as user-selected from a plurality of previously stored readings.

23. The cinematographic incident-illumination-sensing instrument as defined in claim 3 wherein said processor and said user control means are configured such that, in the dedicated mode, a series of five readings can be stored and subsequently any quantity from one to five of the readings can be user-selected and displayed simultaneously.

24. The cinematographic incident-illumination-sensing instrument as defined in claim 14 further comprising:

data-hold memory means holding a most recent set of data in memory for a predetermined memory-hold time interval of data input inactivity, typically 10 minutes, the memory-hold time interval being renewed after re-setting any of said user switches.

25. The light meter instrument as defined in claim 20 wherein said processor, said display panel and said user control means are made to cooperate in a manner to provide selection by the user from at least two different unit systems such as footcandles and lux for indicating light measurements, and to provide automatic calibration and visual indication of the unit system selected, on said display panel.

* * * * *

UNITED STATES PATENT AND TRADEMARK OFFICE
CERTIFICATE OF CORRECTION

PATENT NO. : 5,486,914

DATED : January 23, 1996

INVENTOR(S) : Denove et al

It is certified that error appears in the above-identified patent and that said Letters Patent is hereby corrected as shown below:

Column 1, line 20, between "light" and "reflected", the comma "," should be deleted.

Column 3, line 7, "selfexplanatory" should be hypenated: --self-explanatory--.

Claim 11, column 13, line 33, delete "light meter" and insert therefor
--cinematographic incident-illumination-sensing instrument--

Claim 25, column 16, line 31, delete "light meter" and insert therefor
--cinematographic incident-illumination-sensing instrument--

Signed and Sealed this

Twentieth Day of August, 1996

*Attest:*

BRUCE LEHMAN

*Attesting Officer*  *Commissioner of Patents and Trademarks*